United States Patent [19]
Fudeyasu et al.

[11] Patent Number: 6,154,837
[45] Date of Patent: Nov. 28, 2000

[54] MICROCOMPUTER ENABLING AN ERASE/ WRITE PROGRAM OF A FLASH MEMORY TO INTERRUPT BY TRANSFERRING INTERRUPT VECTORS FROM A BOOT ROM TO A RAM

[75] Inventors: Norihiko Fudeyasu; Nobusuke Abe, both of Tokyo, Japan

[73] Assignee: Mitsubishi Denki Kabushiki Kaisha, Tokyo, Japan

[21] Appl. No.: 09/119,577

[22] Filed: Jul. 21, 1998

[30] Foreign Application Priority Data

Feb. 2, 1998 [JP] Japan .................................. 10-021305

[51] Int. Cl.$^7$ ...................................................... G06F 9/445
[52] U.S. Cl. ........................................................................ 713/2
[58] Field of Search ...................................................... 713/2

[56] References Cited

U.S. PATENT DOCUMENTS 4,679,166   7/1987   Berger et al. ................................ 713/2
5,881,295   3/1999   Iwata ........................................ 710/262

Primary Examiner—Thomas M. Heckler
Attorney, Agent, or Firm—Burns, Doane, Swecker & Mathis, LLP

[57] ABSTRACT

A microcomputer including a boot ROM that stores a boot program for transferring from an outside source to a RAM an erase/write program for rewriting a flash ROM. A CPU transfers the boot program from the boot ROM to the RAM, and executes it in a boot mode, and relocates the entire interrupt vectors excluding a reset interrupt vector to the RAM in the boot mode, with the reset interrupt vector remaining in the boot ROM. This enables the erase/write program transferred to the RAM to execute interrupt processings which cannot be carried out in a conventional microcomputer.

6 Claims, 4 Drawing Sheets

ADDRESS SPACE OF THE MICROCOMPUTER

MICROCOMPUTER ENABLING AN ERASE/WRITE PROGRAM OF A FLASH MEMORY TO INTERRUPT BY TRANSFERRING INTERRUPT VECTORS FROM A BOOT ROM TO A RAM

BACKGROUND OF THE INVENTION

1. Field of the Invention

The present invention relates to a microcomputer including a flash ROM rewritable on a chip by chip basis, a boot ROM storing a boot program, and a RAM, and particularly to a microcomputer that transfers, by using the boot program, a program from an outside source to the RAM, and rewrites the flash ROM using that program.

2. Description of Related Art

In a common microcomputer, interrupt vectors usable by a user are set in a memory area opened to the user (which is called "user open area" from now on). Accordingly, an interrupt taking place during execution of a user's program is treated by an interrupt handler the user prepared in the user open area. Thus, the user program generally forms a closed system on the microcomputer.

Consider under such a condition a case in which an erase/write program (referred to as "E/W program" from now on), which is prepared by a user for rewriting data in a flash ROM by a CPU, is transferred from an outside source to a RAM using a boot program a maker created and stored in a boot ROM.

In this case, all interrupt vectors are present on the boot ROM including a boot program to be initially activated, and the boot program itself requires interrupt processing which is also included in the boot program. Thus, the E/W program transferred from the outside source to the RAM cannot handle the interrupt. Even if it could handle the interrupt, it can execute only the interrupt handler the maker created, which restricts the user in creating the E/W program.

Furthermore, even if the microcomputer has a function to move the entire interrupt vectors to the RAM by carrying out a mode switching using some means so that the E/W program can achieve the interrupt processing after it has been transferred to the RAM, the mode switching must be carried out again to restart the boot program if it is required to run the boot program due to an error or the like occurring during the execution of the E/W program. Thus, it is probable that the mode must be switched a number of times during debugging of the E/W program.

Matters relevant to such a conventional microcomputer are disclosed in Japanese patent application laid-open Nos. 4-205047/1992, 2-114293/1990 and 2-66664/1990 among others. The first document '047 discloses a technique applied to a multi-processor system, in which a main processor loads into a dual-port RAM a program and interrupt vectors used by a sub-processor so that the sub-processor executes it. The second document '293 discloses an example in which a download program is downloaded into a common memory including a reset vector area, and the third one '664 discloses an example that prepares a register for holding an initial program and interrupt address. However, they do not refer to the E/W program of the flash ROM or its equivalent.

In summary, since the conventional microcomputer has a configuration as described above, the E/W program transferred from the outside source to the RAM cannot handle the interrupt. Even if it could handle the interrupt, the user has a problem of being restricted in creating it. In addition, moving the entire interrupt vectors to the RAM after carrying out the mode switching by some means presents another problem in that it is likely that the mode must be changed many times during the debugging of the E/W program.

SUMMARY OF THE INVENTION

The present invention is implemented to solve the foregoing problems. It is therefore an object of the present invention to provide a microcomputer which can simplify the flow from the execution of the boot program to that of the E/W program, and allows the E/W program to execute the interrupt processing freely. This is implemented by dividing the contents of the interrupt processing considering the difference in characteristics of the two programs, the (maker-dominated) boot program and the (user-dominated) E/W program.

According to a first aspect of the present invention, there is provided a microcomputer comprising: a RAM; a flash ROM that is rewritable; a boot ROM for storing a boot program used for transferring from an outside source to the RAM an erase/write program for rewriting data of the flash ROM; and a CPU for executing, in a boot mode in which the CPU executes the boot program, the boot program on the RAM after transferring the boot program from the boot ROM to the RAM, and for transferring interrupt vectors from the boot ROM to the RAM when executing the boot program on the RAM.

Here, in the boot mode, the boot ROM may store a reset interrupt vector, and the RAM may store entire interrupt vectors excluding the reset interrupt vector.

In the boot mode, the boot ROM may store non maskable interrupt vectors, and the RAM may store maskable interrupt vectors excluding the non maskable interrupt vectors.

According to a second aspect of the present invention, there is provided a microcomputer comprising: a RAM; a flash ROM that is rewritable; a boot ROM for storing a boot program used for transferring from an outside source to the RAM an erase/write program for rewriting data of the flash ROM; and a CPU for executing, in a boot mode in which the CPU executes the boot program, the boot program on the boot ROM to transfer the erase/write program from the outside source to the RAM, and for transferring interrupt vectors to the RAM by switching, after completing transfer of the erase/write program to the RAM, the boot mode to an erase/write mode in which the CPU executes the erase/write program on the RAM.

Here, the boot ROM may store entire interrupt vectors while the CPU is transferring the erase/write program to the RAM by using the boot program, and the CPU may relocate the entire interrupt vectors excluding a reset interrupt vector by switching a mode after completing the transfer of the erase/write program to the RAM.

The boot ROM may store entire interrupt vectors while the CPU is transferring the erase/write program to the RAM by using the boot program, and the CPU may relocate maskable interrupt vectors excluding non maskable interrupt vectors by switching a mode after completing the transfer of the erase/write program to the RAM.

BRIEF DESCRIPTION OF THE DRAWINGS

FIGS. 3A and 3B are flowcharts showing procedures in the embodiment 1, wherein FIG. 3A illustrates a procedure for transferring an E/W program from an outside source to a RAM, and FIG. 3B illustrates a procedure for handling an interrupt occurred in step ST2 of FIG. 3A;

FIGS. 4A and 4B are flowcharts showing procedures of the E/W program in the embodiment 1, wherein FIG. 4A illustrates the processing of the E/W program, and FIG. 4B illustrates a procedure for handling an interrupt occurred in step ST6 of FIG. 4A;

FIGS. 7A and 7B are flowcharts showing procedures in the embodiment 3, wherein FIG. 7A illustrates a procedure for transferring an E/W program from the outside source to the RAM, and FIG. 7B illustrates a procedure for handling an interrupt occurred in step ST11 of FIG. 7A; and FIGS. 8A and 8B are flowcharts showing procedures of the E/W program in the embodiment 3, wherein FIG. 8A illustrates the processing of the E/W program, and FIG. 8B illustrates a procedure for handling an interrupt occurred in step ST15 of FIG. 8A.

DETAILED DESCRIPTION OF THE PREFERRED EMBODIMENTS

The invention will now be described with reference to the accompanying drawings.

Embodiment 1

Figure 1:
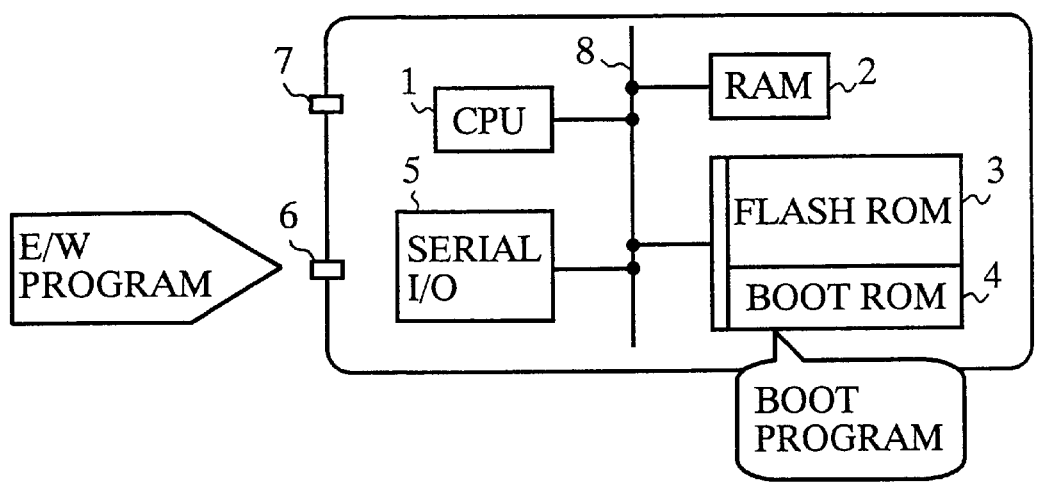
FIG. 1 is a block diagram showing an embodiment 1 of a microcomputer in accordance with the present invention.

FIG. 1 is a block diagram showing an embodiment 1 of a microcomputer in accordance with the present invention. In FIG. 1, the reference numeral 1 designates a CPU for carrying out the entire control of the microcomputer, and 2 designates a RAM used as a work memory or the like of the CPU 1. The reference numeral 3 designates a flash ROM whose data are rewritable on a chip by chip basis, and 4 designates a boot ROM 4 for transferring from an outside source to the RAM 2 an erase/write (E/W) program executed by the CPU 1 to rewrite data on the flash ROM 3. The reference numeral 5 designates a serial I/O for controlling the exchange of data with outside sources, and 6 designates an I/O port connected with the serial I/O 5. The reference numeral 7 designates a reset port through which a reset signal is input to the microcomputer, and 8 designates an internal bus for connecting the RAM 2, flash ROM 3, boot ROM 4 and serial I/O 5 with the CPU 1.

The boot ROM 4 has already stored a boot program that causes the serial I/O 5 to receive through the I/O port 6 the E/W program transferred from the outside source, and the RAM to store it.

Figure 2:
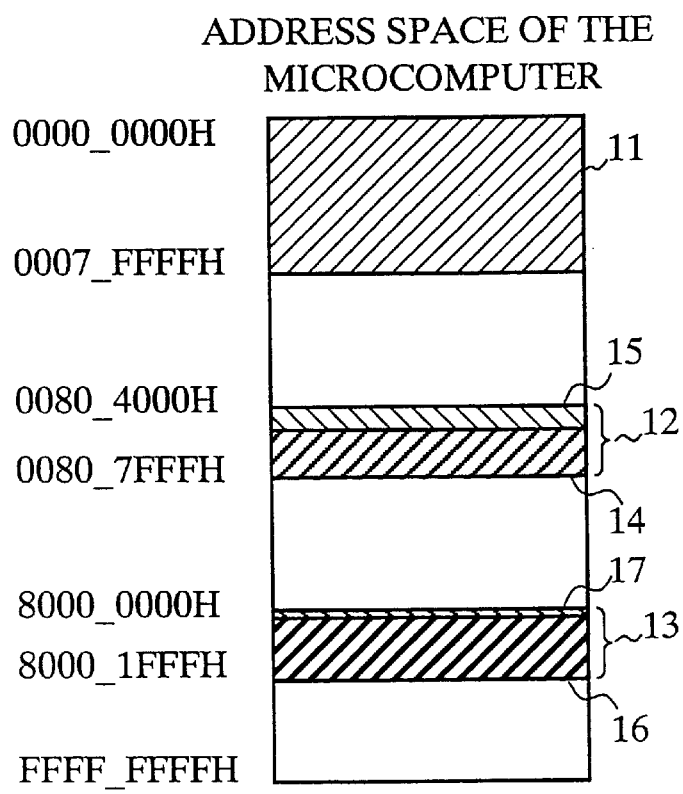
FIG. 2 is a diagram illustrating an example of the interrupt vector allocation in the boot mode in embodiments 1 and 3.

FIG. 2 is a diagram illustrating an example of the interrupt vector allocation on the address space of the microcomputer in the boot mode in which the boot program stored in the boot ROM 4 is read and executed. In FIG. 2 illustrating the address space of the microcomputer, the reference numeral 11 designates a flash ROM area allocated to the flash ROM 3; 12 designates a RAM area allocated to the RAM 2; and 13 designates a boot ROM area allocated to the boot ROM 4. The reference numeral 14 designates a program area 14 in the RAM area 12, to which the boot program and E/W program are transferred; and 15 designates an interrupt vector storing area in the RAM area 12, in which interrupt vectors other than the reset interrupt vector are stored. The reference numeral 16 designates a boot program area in the boot ROM area 13, in which the boot program has been stored in advance; and 17 designates a reset interrupt vector area in the boot ROM area 13, in which the reset interrupt vector is stored.

Next, the operation of the present embodiment 1 will be described.

Figure 3A:
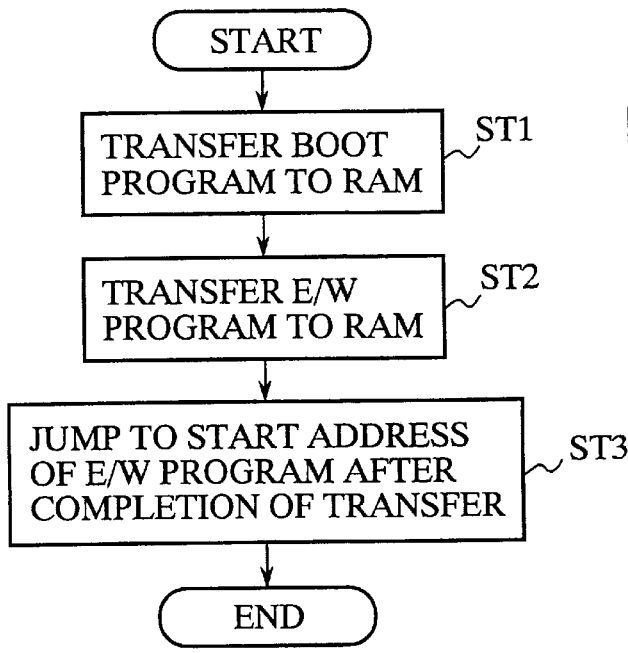
Figure 3B:
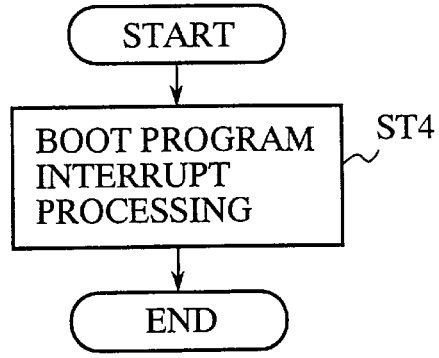

First, the CPU 1 changes its operation mode to the boot mode in which it operates in accordance with the boot program in the boot program area 16. Subsequently, when the reset port 7 undergoes the reset release, the CPU 1 carries out the instruction fetch from an address written in the reset interrupt vector area 17 in the boot ROM area 13, thereby starting the execution of the boot program. FIGS. 3A and 3B are flowcharts illustrating the processing procedure of the boot program.

When started, the boot program, which has an interrupt processing routine in itself, transfers itself to the RAM 2 in step ST1 of FIG. 3A. The boot program transferred to the RAM 2 is stored in the program area 14 in the RAM area 12. In addition, the interrupt vectors excluding the reset interrupt vector are transferred from the boot ROM area 13 to the interrupt vector storing area 15 in the RAM area 12 to be stored therein. Completing the transfer of the boot program to the RAM 2, the CPU 1 proceeds its processing to step ST2, in which it activates the serial I/O 5 to receive the E/W program from the outside source through the I/O port 6. The received E/W program is transferred just as it is through the internal bus 8 to the RAM 2 which stores it in an area different from the area that stored the boot program before. Completing the transfer of the E/W program, the CPU 1 proceeds to step ST3 in which the CPU 1 jumps to the start address of the E/W program to change the control from the boot program to the E/W program by means of software, thereby shifting to the E/W mode.

If an interrupt takes place during the execution of step ST2, the CPU 1 branches to step ST4 of FIG. 3B to execute the boot program interrupt processing. If the interrupt is the reset interrupt, the CPU 1 restarts the boot program in accordance with the reset interrupt vector address stored in the reset interrupt vector area 17 in the boot ROM area 13.

Figure 4A:
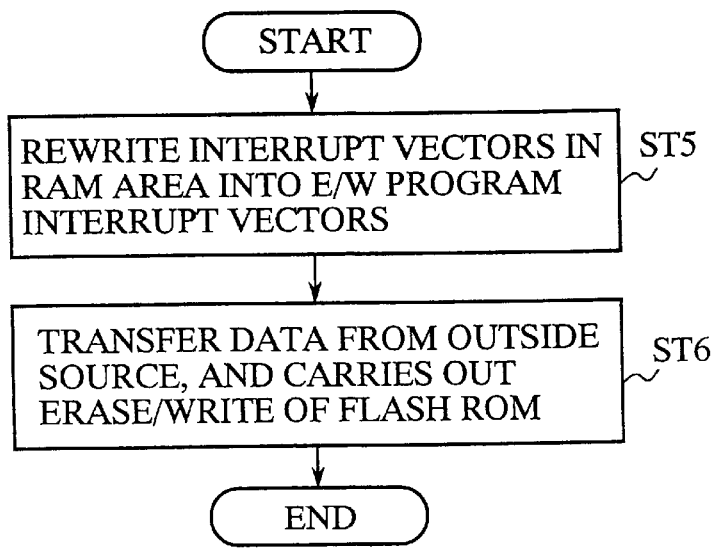
Figure 4B:
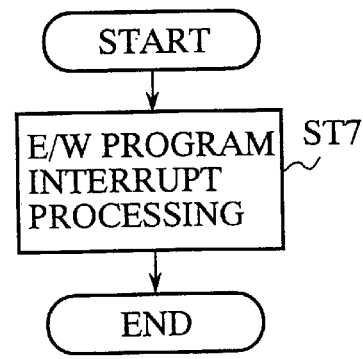

FIG. 4A and 4B are flowcharts illustrating the processing procedure of the E/W program.

Changing from the boot mode to the E/W mode, the CPU 1 starts the E/W program to rewrite the interrupt vectors in step ST5. More specifically, the CPU 1 rewrites the interrupt vectors other than the reset interrupt vector, which is stored in the interrupt vector storing area 15 in the RAM area 12, from boot program interrupt jump addresses to E/W program interrupt jump addresses, thereby changing the addresses for the boot program to those for the E/W program. This enables the E/W program to execute the interrupt processing freely. Afterward, the CPU 1 activates the serial I/O 5 in step ST6 to received data from the outside source, and carries out writing of the flash ROM 3 on the basis of the data, or erasing of its data.

If an interrupt takes place during the execution of step ST6, the CPU 1 branches to step ST7 of FIG. 4B to execute the E/W program interrupt processing in accordance with the interrupt vector addresses stored in the interrupt vector storing area 15 in the RAM area 12, which have been rewritten in step ST5. If the interrupt is the reset interrupt, the CPU 1 restarts the boot program in accordance with the reset interrupt vector address stored in the reset interrupt vector area 17 in the boot ROM area 13.

According to the present embodiment 1, since the reset interrupt vector is located in the boot ROM 4 and the other interrupt vectors are located in the RAM 2 in the boot mode, the flow from the boot program to the E/W program is simplified when executing the E/W program for erasing/writing the flash ROM 3 after transferring the E/W program from the outside source to the RAM 2 by using the boot program. In addition, this enables the E/W program to execute the interrupt processing freely. Thus, the present embodiment 1 offers an advantage of being able to provide the microcomputer that can achieve effective interrupt processing in the boot mode.

Embodiment 2

Figure 5:
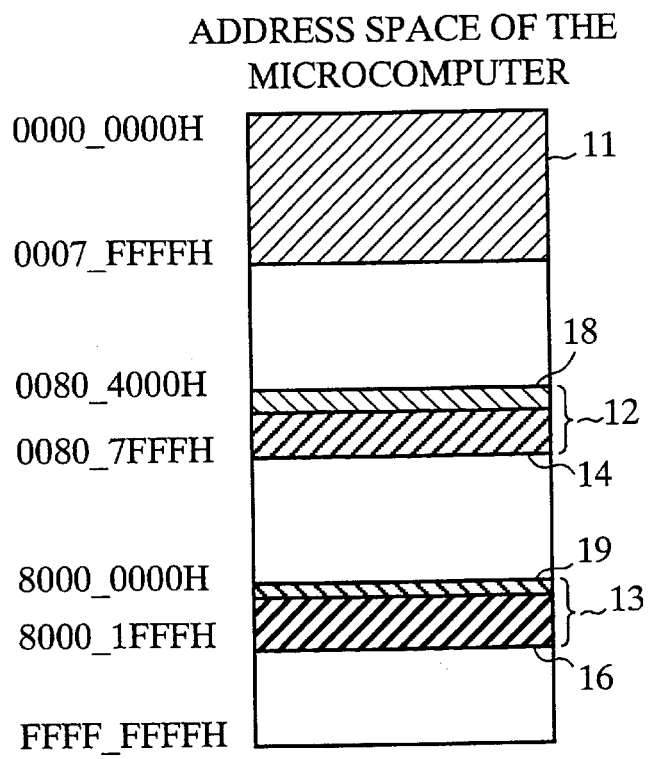
FIG. 5 is a diagram illustrating an example of the interrupt vector allocation in the boot mode in embodiments 2 and 4.

FIG. 5 is a diagram illustrating an example of the interrupt vector allocation in the boot mode in an embodiment 2 of the microcomputer in accordance with the present invention. In FIG. 5, the same reference numerals to those of FIG. 2 designate the corresponding portions, and the description thereof is omitted here. The reference numeral 18 designates a maskable interrupt vector storing area in the RAM area 12, in which maskable interrupt vectors are stored; and 19 designates a reset interrupt non maskable vector area in the boot ROM area 13, in which non maskable interrupt vectors are stored.

Since the basic configuration of the present embodiment 2 is the same as that of the embodiment 1 except for the interrupt vector allocation shown in FIG. 5, drawings showing the configuration of the microcomputer and the processing procedures of the boot program and E/W program are omitted here.

Next, the operation of the present embodiment 2 will be described.

As in the embodiment 1, making the transition to the boot mode first, the CPU 1 activates the boot program to transfer the boot program itself to the RAM 2, and stores it into the program area 14 in the RAM area 12. Subsequently, the CPU 1 stores the E/W program, which is received from the outside source through the serial I/O 5, into an area in the program area 14 different from the area storing the boot program. Afterward, the CPU 1 moves from the boot program to the E/W program by means of software, thereby shifting to the E/W mode. The E/W program rewrites the maskable interrupt vectors in the maskable interrupt vector storing area 18 in the RAM area 12 from the boot program interrupt jump addresses to the E/W program interrupt jump addresses to change them to the maskable interrupt vectors for the E/W program, thereby enabling the E/W program to carry out the interrupt processing freely.

As in the embodiment 1, if a non maskable interrupt takes place in the course of the foregoing processings, the CPU 1 restarts the boot program in accordance with the addresses stored in the reset interrupt non maskable vector area 19 in the boot ROM area 13. In contrast, if any one of the maskable interrupts occurs, the CPU 1 executes its processing after branching to its address stored in the maskable interrupt vector storing area 18 in the RAM area 12.

Thus, the present embodiment 2 offers an advantage of being able to restart the boot from its very beginning, even if an erroneous interrupt, which results from a factor of the system other than a direct interrupt like a reset, has occurred in the microcomputer while executing the boot program on the RAM 2 after transferring it to the RAM 2 in order to transfer the E/W program from the outside source to the RAM 2.

Embodiment 3

Figure 6:
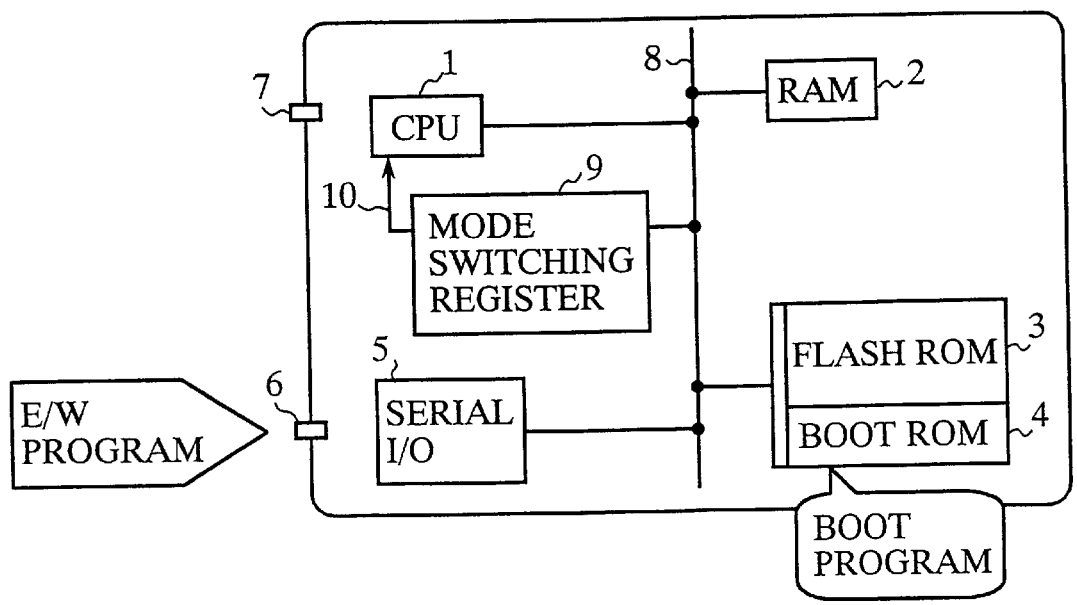
FIG. 6 is a block diagram showing an embodiment 3 of the microcomputer in accordance with the present invention.

FIG. 6 is a block diagram showing an embodiment 3 of the microcomputer in accordance with the present invention. In FIG. 6, corresponding portions to those of FIG. 1 are designated by the same reference numerals, and the description thereof is omitted here. The reference numeral 9 designates a mode switching register that is set by the E/W program when the CPU 1 shifts from the boot program to the E/W program; and 10 designates an interrupt vector to address control signal that is asserted when the mode switching register 9 is set.

In the present embodiment 3, the boot program has already been stored in the boot ROM 4 as in the embodiment 1 in order that the serial I/O 5 receives the E/W program transferred from the outside source through the I/O port 6, and the RAM 2 stores it. Furthermore, the interrupt vector allocation in the boot mode is the same as that of the embodiment 1 shown in FIG. 2, excluding that the entire interrupt vectors are located in the boot ROM area 13 from the beginning of the boot mode.

Next, the operation of the present embodiment 3 will be described.

Figure 7A:
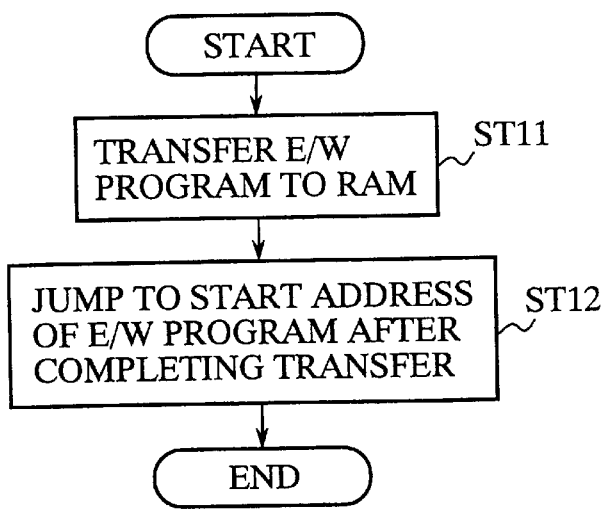
Figure 7B:
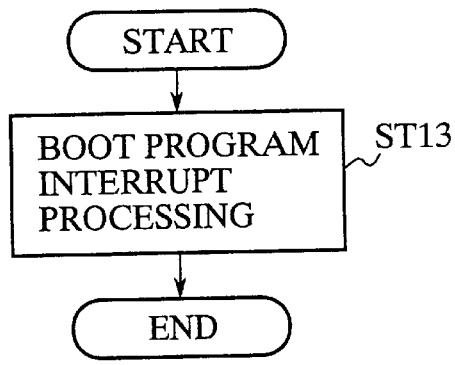

As in the embodiment 1, the CPU 1 makes the transition to the boot mode, and carries out the instruction fetch from the address written in the reset interrupt vector area 17 in the boot ROM area 13 to start the boot program. Since the entire interrupt vectors are located in the boot ROM area 13 from the beginning, which differs from the embodiment 1, it is not necessary to transfer the boot program to the RAM 2. Thus, the boot program is executed on the boot ROM area 13 without being transferred. FIGS. 7A and 7B are flowcharts illustrating its processing procedures.

Starting the boot program, the CPU 1 activates in step ST11 the serial I/O 5 to receive the E/W program from the outside source. The received E/W program is transferred from the serial I/O 5 to the RAM 2 through the internal bus 8, and is stored in the program area 14 in the RAM area 12. After completing the transfer of the E/W program, the CPU 1 proceeds to step ST12, in which it jumps to the start address of the E/W program to shift from the boot program to the E/W program by means of software, thereby making the transition to the E/W mode. If an interrupt takes place during the processing in step ST11, the CPU 1 branches to step ST13 of FIG. 7B to execute the boot program interrupt processing. In the boot mode, the interrupt vectors located in the boot ROM area 13 are made effective.

Figure 8A:
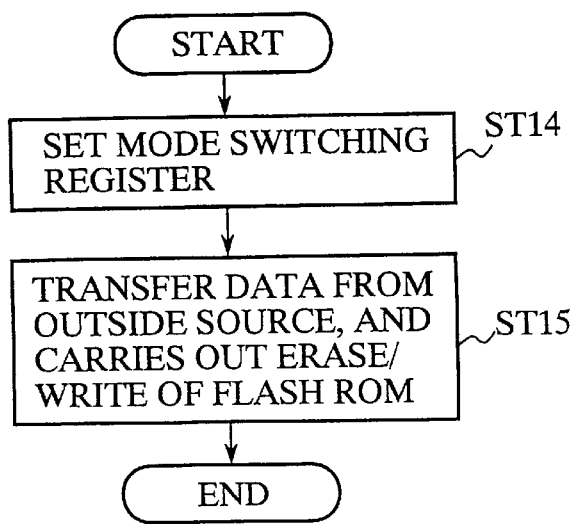
Figure 8B:
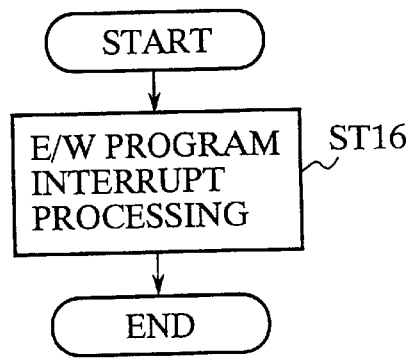

FIGS. 8A and 8B are flowcharts illustrating a processing procedure of the E/W program.

Making the transition from the boot mode to the E/W mode, the CPU 1 starts the E/W program to set the mode switching register 9 by rewriting its value in step ST14. The mode switching register 9, after having been set, asserts the interrupt vector address control signal 10 so that the entire interrupt vectors excluding the reset interrupt vector are relocated into the RAM 2. In other words, all the interrupt vectors other than the reset interrupt vector are relocated in the RAM area 12, and the reset interrupt vector remains located in the boot ROM area 13. This enables the E/W program to carry out the interrupt processings freely. The mode switching register 9 is arranged such that it is initialized when the reset is applied to the reset port 7, and makes a backward transition to the boot mode again if the reset interrupt occurs while the E/W program is running. Afterward, in step ST15, the CPU 1 activates the serial I/O 5 to receive the data from the outside source, and carries out writing of the flash ROM 3 based on the data, or erases its data.

If an interrupt takes place during the processing in step ST15, the CPU 1 branches to step ST16 in FIG. 8B to execute the E/W program interrupt processing. However, if the interrupt is the reset interrupt, the CPU 1 restarts the boot program from its beginning as shown in FIG. 7A. In the E/W mode, the reset interrupt vector located in the boot ROM area 13 becomes effective for the reset interrupt, while the other interrupt vectors relocated in the RAM area 12 become effective for the remaining interrupts.

According to the present embodiment 3, since the entire interrupt vectors are located in the boot ROM 4 while transferring the E/W program from the outside source to the RAM 2, and subsequently the entire interrupt vectors except for the reset interrupt vector are relocated in the RAM 2 by switching the mode after completing the transfer, the flow from the boot program to the E/W program is simplified when executing the E/W program for erasing/writing the flash ROM 3 after the transfer of the E/W program using the boot program. In addition, this enables the E/W program to execute the interrupt processing freely. Thus, the present embodiment 3 offers an advantage of being able to provide the microcomputer with a function that can achieve effective interrupt processing in the boot mode.

Embodiment 4

Although the entire interrupt vectors excluding the reset interrupt vector are relocated into the RAM 2 after completing the transfer of the E/W program to the RAM 2 in the embodiment 3 of the microcomputer, all the maskable interrupt vectors can be relocated into the RAM 2 with the non maskable interrupt vectors remaining. An embodiment 4 implements the microcomputer based on this idea. It is basically the same as the embodiment 3 except for the interrupt vector allocation. Thus, the drawings of the configuration of the microcomputer, and the processing procedures of the boot program and E/W program are omitted here. The arrangement of the interrupt vectors in the boot mode is the same as that of the embodiment 2 as shown in FIG. 5, excluding that the entire interrupt vectors are located in the boot ROM area 13 from the beginning of the boot mode.

Next, the operation of the present embodiment 4 will be described.

As in the embodiment 3, making a transition to the boot mode, the CPU 1 activates and executes the boot program on the boot ROM 4 to receive the E/W program from the outside source and store it into the RAM area 12. Afterward, the CPU 1 shifts from the boot program to the E/W program by means of software to start the E/W mode. The E/W program asserts the interrupt vector address control signal 10 by setting the mode switching register 9 so that the maskable interrupt vectors other than the non maskable interrupt vectors, which are located in the boot ROM area 13, are relocated into the RAM area 12. This enables the E/W program to carry out the interrupt processing freely.

As in the embodiment 3, if an interrupt taking place in the course of the foregoing processings is a non maskable interrupt, the CPU 1 restarts the boot program in accordance with the non maskable interrupt vector address located in the boot ROM area 13. In contrast, if any one of the maskable interrupts occurs, the CPU 1 executes, in the boot mode, its processing after branching to the maskable interrupt vector address located in the boot ROM area 13 in the boot mode, and executes, in the E/W mode, the interrupt processing after branching to the maskable interrupt vector address relocated in the RAM area 12.

Thus, the present embodiment 4 offers an advantage of being able to restart the boot from its very beginning, even if an erroneous interrupt, which results from a factor of the system other than a direct interrupt like a reset, has occurred in the microcomputer while executing the boot program on the boot ROM 4 without transferring it in order to transfer the E/W program from the outside source to the RAM 2.

What is claimed is:

1. A microcomputer comprising:

a RAM;

a flash ROM that is rewritable, connected to said RAM;

a boot ROM, connected to said RAM and said flash ROM for storing a plurality of interrupt vectors and for storing a boot program used for transferring an erase/write program for rewriting data of said flash ROM from a source outside said microcomputer via an input/output port to said RAM; and a CPU, connected to said RAM, said flash ROM, and said boot ROM, for operating in a boot mode for transferring the boot program from said boot ROM to said RAM, for executing said boot program stored in said RAM, and for transferring at least one of said plurality of interrupt vectors from said boot ROM to said RAM when executing said boot program stored in said RAM.

2. The microcomputer as claimed in claim 1, wherein in said boot mode, said boot ROM stores a reset interrupt vector, and said RAM stores said at least one of said plurality of interrupt vectors excluding said reset interrupt vector.

3. The microcomputer as claimed in claim 1, wherein in said boot mode, said boot ROM stores non maskable interrupt vectors, and said RAM stores maskable interrupt vectors excluding said non maskable interrupt vectors.

4. A microcomputer comprising:

a RAM;

a flash ROM that is rewritable, connected to said RAM;

a boot ROM, connected to said RAM, said flash ROM, and said boot ROM, for storing a plurality of interrupt vectors and for storing a boot program used for transferring an erase/write program for rewriting data of said flash ROM from a source outside said microcomputer and an input/output port to said RAM; and a CPU, connected to said RAM, said flash ROM, and said boot ROM, for operating, in a boot mode for executing said boot program stored in said boot ROM to transfer said erase/write program from said source outside said microcomputer to said RAM, and after completing transfer of said erase/write program to said RAM, switching said boot mode to an erase/write mode in which said CPU executes said erase/write program on said RAM wherein said CPU transfers at least one of said plurality of interrupt vectors from said boot ROM to said RAM during execution of said erase/write program.

5. The microcomputer as claimed in claim 4, wherein said boot ROM stores said plurality of interrupt vectors while said CPU is transferring said erase/write program to said RAM by using said boot program, and said CPU relocates said plurality of interrupt vectors into said RAM excluding a reset interrupt vector by switching a mode after completing the transfer of the erase/write program to said RAM.

6. The microcomputer as claimed in claim 4, wherein said boot ROM stores said plurality of interrupt vectors while said CPU is transferring said erase/write program to said RAM by using said boot program, and said CPU relocates maskable interrupt vectors into said RAM excluding non maskable interrupt vectors by switching a mode after completing the transfer of the erase/write program to said RAM.

* * * * *